United States Patent
Pfaff et al.

(10) Patent No.: US 12,305,364 B2
(45) Date of Patent: May 20, 2025

(54) CONTROL OF MULTIPLE POWER MACHINES

(71) Applicant: Doosan Bobcat North America, Inc., West Fargo, ND (US)

(72) Inventors: John Pfaff, Bismarck, ND (US); Matthew Sagaser, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 204 days.

(21) Appl. No.: 18/145,519

(22) Filed: Dec. 22, 2022

(65) Prior Publication Data
US 2023/0193592 A1 Jun. 22, 2023

Related U.S. Application Data

(60) Provisional application No. 63/292,772, filed on Dec. 22, 2021.

(51) Int. Cl.
*E02F 9/20* (2006.01)
*G05D 1/223* (2024.01)
*H04L 12/40* (2006.01)

(52) U.S. Cl.
CPC ............ *E02F 9/205* (2013.01); *E02F 9/2004* (2013.01); *E02F 9/2037* (2013.01); *G05D 1/223* (2024.01);
(Continued)

(58) Field of Classification Search
CPC ....... E02F 9/205; E02F 9/2004; E02F 9/2037; E02F 9/2054; E02F 9/225; E02F 9/261;
(Continued)

(56) References Cited

U.S. PATENT DOCUMENTS

| | | |
|---|---|---|
| 6,148,255 A | 11/2000 | van der Lely |
| 6,167,337 A | 12/2000 | Haack et al. |

(Continued)

FOREIGN PATENT DOCUMENTS

| | | |
|---|---|---|
| EP | 1452651 A1 | 9/2004 |
| EP | 3556713 A1 | 10/2019 |

(Continued)

OTHER PUBLICATIONS

International Searching Authority, International Search Report and Written Opinion from corresponding PCT Application No. PCT/US2022/082262 mailed Apr. 25, 2023 [13 pgs].

*Primary Examiner* — Michael J Zanelli
(74) *Attorney, Agent, or Firm* — Quarles & Brady LLP

(57) ABSTRACT

A control system is provided for a first power machine having a first actuator and a second power machine having a second actuator. The first power machine includes a first user input device. Aa first user input corresponding to a power machine operation can be received via the first user input device and a control mode for controlling the execution of the power machine operation can be determined. Controlling the execution of the power machine operation can selectively include: in a local control mode, controlling the first actuator to execute the power machine operation with the first power machine; and in a remote control mode, controlling the second actuator to execute the power machine operation with the second power machine.

23 Claims, 6 Drawing Sheets

(52) U.S. Cl.
CPC .... *H04L 12/40* (2013.01); *H04L 2012/40215* (2013.01)

(58) Field of Classification Search
CPC ....... E02F 3/3414; G05D 1/223; H04L 12/40; H04L 2012/40215; H04N 7/181
See application file for complete search history.

(56) References Cited

U.S. PATENT DOCUMENTS

| | | |
|---|---|---|
| 7,278,567 B2 | 10/2007 | Ferguson et al. |
| 8,195,358 B2 | 6/2012 | Anderson |
| 8,467,943 B2 | 6/2013 | Dersjo et al. |
| 9,217,240 B2 | 12/2015 | Shibata |
| 9,550,499 B2 | 1/2017 | Sakai |
| 9,649,999 B1 | 5/2017 | Amireddy et al. |
| 9,824,490 B1 * | 11/2017 | Côté ..................... G06T 19/006 |
| 9,982,415 B2 | 5/2018 | Yamada et al. |
| 10,144,390 B1 | 12/2018 | Chaston et al. |
| 10,198,010 B2 | 2/2019 | Hiramatsu et al. |
| 10,214,877 B2 | 2/2019 | Yamada et al. |
| 10,279,825 B2 | 5/2019 | Kim et al. |
| 10,337,174 B2 | 7/2019 | Okumura et al. |
| 10,474,228 B2 | 11/2019 | Niccolini et al. |
| 10,669,693 B2 | 6/2020 | Wei |
| 10,717,200 B2 | 6/2020 | Machida et al. |
| 10,719,289 B2 | 7/2020 | DiFederico et al. |
| 10,788,821 B2 | 9/2020 | Matsuzaki et al. |
| 10,820,491 B2 | 11/2020 | Kowalchuk |
| 11,062,511 B2 | 7/2021 | Hendron |
| 11,068,015 B2 | 7/2021 | Ofenloch et al. |
| 11,505,919 B2 | 11/2022 | Kandula et al. |
| 2001/0022818 A1 | 9/2001 | Nagata et al. |
| 2006/0047377 A1 | 3/2006 | Ferguson et al. |
| 2009/0222186 A1 | 9/2009 | Jensen |
| 2010/0091103 A1 | 4/2010 | Peltonen et al. |
| 2016/0224021 A1 | 8/2016 | Kuikka |
| 2017/0284069 A1 | 10/2017 | Machida et al. |
| 2019/0127952 A1 | 5/2019 | Phaff et al. |
| 2019/0322496 A1 | 10/2019 | Hayashi |
| 2019/0387219 A1 | 12/2019 | Kondo et al. |
| 2020/0018049 A1 | 1/2020 | Takahama et al. |
| 2020/0063397 A1 | 2/2020 | Hatake et al. |
| 2020/0125114 A1 | 4/2020 | Minagawa et al. |
| 2020/0240110 A1 | 7/2020 | Takahama et al. |
| 2020/0359543 A1 | 11/2020 | Dix |
| 2020/0392701 A1 | 12/2020 | Aizawa et al. |
| 2020/0399863 A1 | 12/2020 | Aizawa et al. |
| 2021/0002860 A1 | 1/2021 | Otani et al. |
| 2021/0010237 A1 | 1/2021 | Aizawa et al. |
| 2021/0010244 A1 * | 1/2021 | Ito ........................... E02F 9/262 |
| 2021/0032844 A1 | 2/2021 | Wagner |
| 2021/0062473 A1 | 3/2021 | Ding et al. |
| 2021/0230836 A1 | 7/2021 | Ding et al. |
| 2021/0256457 A1 | 8/2021 | Saiki et al. |
| 2021/0340732 A1 * | 11/2021 | Imamura ............... B60K 35/00 |
| 2022/0290402 A1 | 9/2022 | Okada et al. |
| 2022/0364335 A1 | 11/2022 | Spendlove et al. |
| 2022/0364873 A1 | 11/2022 | Gilbeck et al. |

FOREIGN PATENT DOCUMENTS

| | | | |
|---|---|---|---|
| EP | 3504148 B1 | 5/2020 | |
| EP | 3754120 A1 | 12/2020 | |
| EP | 3754122 A1 | 12/2020 | |
| EP | 3767044 A1 | 1/2021 | |
| JP | 4713600 B2 * | 6/2011 | |
| JP | 6765312 B2 | 10/2020 | |
| JP | 7004780 B2 | 1/2022 | |
| WO | WO-2014086384 A1 * | 6/2014 | ............ B60K 28/02 |
| WO | 2015147150 A1 | 10/2015 | |
| WO | 2016031009 A1 | 3/2016 | |
| WO | 2017169373 A1 | 10/2017 | |
| WO | 2017174205 A2 | 10/2017 | |
| WO | 2018124098 A1 | 7/2018 | |
| WO | 2020054366 A1 | 3/2020 | |
| WO | 2020170526 A1 | 8/2020 | |
| WO | 2020194882 A1 | 10/2020 | |
| WO | 2020194883 A1 | 10/2020 | |
| WO | 2020194884 A1 | 10/2020 | |
| WO | 2020196874 A1 | 10/2020 | |
| WO | 2020201473 A3 | 10/2020 | |
| WO | 2020217972 A1 | 10/2020 | |
| WO | 2020241640 A1 | 12/2020 | |
| WO | 2020250557 A1 | 12/2020 | |
| WO | 2020250558 A1 | 12/2020 | |
| WO | 2020260427 A1 | 12/2020 | |
| WO | WO-2020264491 A1 * | 12/2020 | ............ G06F 21/31 |
| WO | 2021019948 A1 | 2/2021 | |
| WO | 2021020567 A1 | 2/2021 | |
| WO | 2021024553 A1 | 2/2021 | |
| WO | 2021049614 A1 | 3/2021 | |
| WO | 2021090906 A1 | 5/2021 | |
| WO | 2021111677 A1 | 6/2021 | |
| WO | 2021124654 A1 | 6/2021 | |
| WO | 2021124858 A1 | 6/2021 | |
| WO | 2021131136 A1 | 7/2021 | |
| WO | 2021131161 A1 | 7/2021 | |
| WO | 2021131228 A1 | 7/2021 | |
| WO | 2021141077 A1 | 7/2021 | |
| WO | 2021149775 A1 | 7/2021 | |
| WO | 2021153187 A1 | 8/2021 | |
| WO | 2021161692 A1 | 8/2021 | |
| WO | 2021161693 A1 | 8/2021 | |
| WO | 2021166476 A1 | 8/2021 | |
| WO | 2021166477 A1 | 8/2021 | |
| WO | 2021166559 A1 | 8/2021 | |
| WO | 2021166566 A1 | 8/2021 | |
| WO | 2021176883 A1 | 9/2021 | |
| WO | 2021181916 A1 | 9/2021 | |
| WO | 2021192483 A1 | 9/2021 | |
| WO | 2021192491 A1 | 9/2021 | |

* cited by examiner

CONTROL OF MULTIPLE POWER MACHINES

CROSS-REFERENCE TO RELATED APPLICATIONS

This application claims priority to U.S. Provisional Patent Application No. 63/292,772, filed on Dec. 22, 2021, the entirety of which is incorporated herein by reference.

BACKGROUND

This disclosure is directed toward power machines. More particularly, this disclosure relates to remote and local control of power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

Conventional power machines can use human-machine interfaces (HMIs) to allow a user to control various operations of the power machine. For example, HMIs can allow an operator to control a speed and a direction of movement of the power machine, and to manipulate a work element that is supported by the power machine (e.g., by actuating one or more actuators). Human-machine interfaces can be provided within a cab or can be included in other types of operator stations of a power machine.

The discussion above is merely provided for general background information and is not intended to be used as an aid in determining the scope of the claimed subject matter.

SUMMARY

Embodiments of the invention, as generally disclosed herein, can relate to control systems and methods for selectively executing local control of operation of a first power machine (e.g., of a first type) and remote control of operation of a second power machine (e.g., of a second different type), including based on user inputs at a human-machine interface of the first power machine that is operable to control both power machines. In some embodiments, an integrated user input device on board a first power machine can be selectively operated in different control modes, including a first control mode in which the device provides signals to command (e.g., exclusively) local control of the first power machine, and a second control mode in which the device provides signals to command (e.g., exclusively) remote control of a second power machine.

Some examples of the disclosure provide a power machine system that can include a first power machine. The first power machine can include a first main frame, a first workgroup work element movably supported by the main frame, a first power source, a first actuator, a first user input device, and a first control device. The first actuator device can be arranged to receive power from the power source to move the first workgroup work element relative to the first main frame. The first user input device can be supported by the first main frame and can be configured to transmit control signals based on inputs provided by a user (e.g., an operator) at the user input device. The first control device can include first one or more processor devices.

The first one or more processor devices can be configured to receive a control signal from the first user input device that corresponds to a power machine operation. Additionally, the first one or more processor devices can be configured to selectively control execution of the power-machine operation under either of a local control mode or a remote control mode. In the local control mode, the first control device can control the first actuator, based on the control signal, to move the first workgroup work element relative to the first main frame. In the remote control mode, the first control device can transmit a wireless signal to a second power machine, based on the control signal, to control operation of a second actuator of the second power machine to move a second workgroup work element relative to a second main frame.

In some examples, the first control device can be configured to receive and display a video transmission from the second power machine under the remote control mode.

In some examples, the first user input device can include a joystick integrated with an operator station of the first power machine.

In some examples, the first user input device can be operably connected to a CAN bus of the first power machine to transmit the control signal to the first one or more processor devices via the CAN bus.

In some examples, the first power machine can include a harness adapted to removably receive the first user input device to place the first user input device in operational communication with the first control device.

In some examples, the first user input device can be configured to allow a user to select between the local control mode and the remote control mode.

In some examples, the first one or more processor devices can be configured to provide a first status indicator to indicate to the user which of the local control mode and the remote control mode the first control device are operating under.

In some examples, the second power machine can be configured to provide a second status indicator to indicate operation of the second power machine under the remote control mode.

In some examples, the first power machine can be a first type of power machine and the second power machine can be a second type of power machine, different from the first type.

In some examples, the first power machine can be an excavator and the second power machine can be a loader.

Some aspects of the disclosure provide a control system for a first power machine with a first actuator and a second power machine with a second actuator. The control system can include a first user input device and one or more processor devices. The first user input device can be integral with a first operator station of the first power machine. The one or more processor devices can be configured to receive a first user input via the first user input device, to determine a control mode for execution of a power machine operation corresponding to the first user input, and to control the execution of the power machine operation. Controlling the execution of the power machine operation can selectively include controlling the execution of the power machine operation in a local control mode and a remote control mode. In the local control mode, controlling the execution of the power machine operation includes controlling the first actuator to execute the power machine operation with the first power machine. In the remote control mode, controlling the execution of the power machine operation includes controlling the second actuator to execute the power machine operation with the second power machine. Controlling the execution of the power machine operations can further include preventing operation of the second power machine in the remote control mode unless one or more physical state conditions are met for the second power machine.

In some examples, the second power machine can include a lockout system configured to selectively prevent operation of one or more actuators of the second power machine in the remote control mode.

In some examples, the one or more processor devices can be configured to control the second actuator in the remote control mode simultaneously with controlling the first actuator in the local control mode based on the received first user input.

In some examples, the one or more processor devices can be configured to control the second actuator according to a predetermined operational routine while simultaneously controlling the first actuator of the first power machine based on the received first user input.

In some examples, the predetermined operation routine can be determined based on a second user input received via one or more user input devices of the first power machine.

In some examples, a second control device can be configured to be removably connected to a CAN bus of the first power machine to send control signals to the one or more processor devices for control of one or more actuators of the first power machine in the local control mode and control of one or more actuators of the second power machine in the remote control mode.

Some aspects of the disclosure provide a method for executing one or more power machine operations is provided. The method can include receiving a first user input from a first user input device at one or more first control devices on a first power machine of a first type that is spaced apart from a second power machine of a second, different type. The first user input can correspond to a first power-machine operation. Additionally, the method can include receiving, at the one or more control devices, a selection of either of a local control mode or a remote control mode. Furthermore, the method can include controlling operation of one or more actuators, with the one or more control devices, to execute the first power-machine operation. If the selection includes the local control mode, controlling the operation of one or more actuators includes controlling operation of a first actuator of the first power machine based on the first user input. If the selection includes the remote control mode, controlling the operation of one or more actuators includes controlling operation of a second actuator of the second power machine based on the first user input.

In some examples, the method can include receiving, at the one or more control devices, an authorization signal from a mobile device. The operation of the one or more actuators can be controlled, in one or more of the local control mode or the remote control mode, further based on receiving the authorization signal.

In some examples, the method can include receiving a video signal from the second power machine during operation of the second actuator under the remote control mode. A display corresponding to the video signal can be provided on a window of a cab of the first power machine.

Some aspects of the disclosure provide a method for executing one or more power-machine operations. A first user input from a first user input device on a first power machine can be received at one or more control devices. A selection of a local control mode or a remote control mode can be received at the one or more control devices. Operation of one or more actuators can be controlled, with the one or more control devices, to execute a first power-machine operation, including: if the received selection includes the local control mode, controlling operation of a first workgroup work element of a first element type that is configured to be moved by a first actuator of the first power machine; and if the received selection includes the remote control mode, controlling operation of a second workgroup work element of a second element type that is configured to be moved by a second actuator of a second power machine that is spaced apart from the first power machine, the second element type being different from the first element type.

In some examples, the first power machine is of a first machine type and the second power machine is of a second machine type different from the first machine type.

Some aspects of the disclosure provide a method for executing one or more power-machine operations. A selection of a remote control mode can be received at one or more control devices on a first power machine. A first user input provided at a first user input device on the first power machine can be received at the one or more control devices. With the one or more control devices, in response to receiving the selection of the remote control mode: a communication link can be established with a second power machine that is spaced apart from the first power machine and is in a standby state in which the second power machine is not enabled to execute powered operation of work elements of the second power machine. Via the communication link: the second power machine can be woken from the standby state to enable powered operation of the work elements of the second power machine; and operation of at least one of the work elements of the second power machine can be controlled based on the first user input provided at the first user input device on the first power machine.

In some examples, the first user input can correspond to operation of at least one work element of the first power machine that is a different type of work element than the at least one work element of the second power machine.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

The following drawings are provided to help illustrate various features of non-limiting examples of the disclosure and are not intended to limit the scope of the disclosure or exclude alternative implementations.

DETAILED DESCRIPTION

Figure 1:
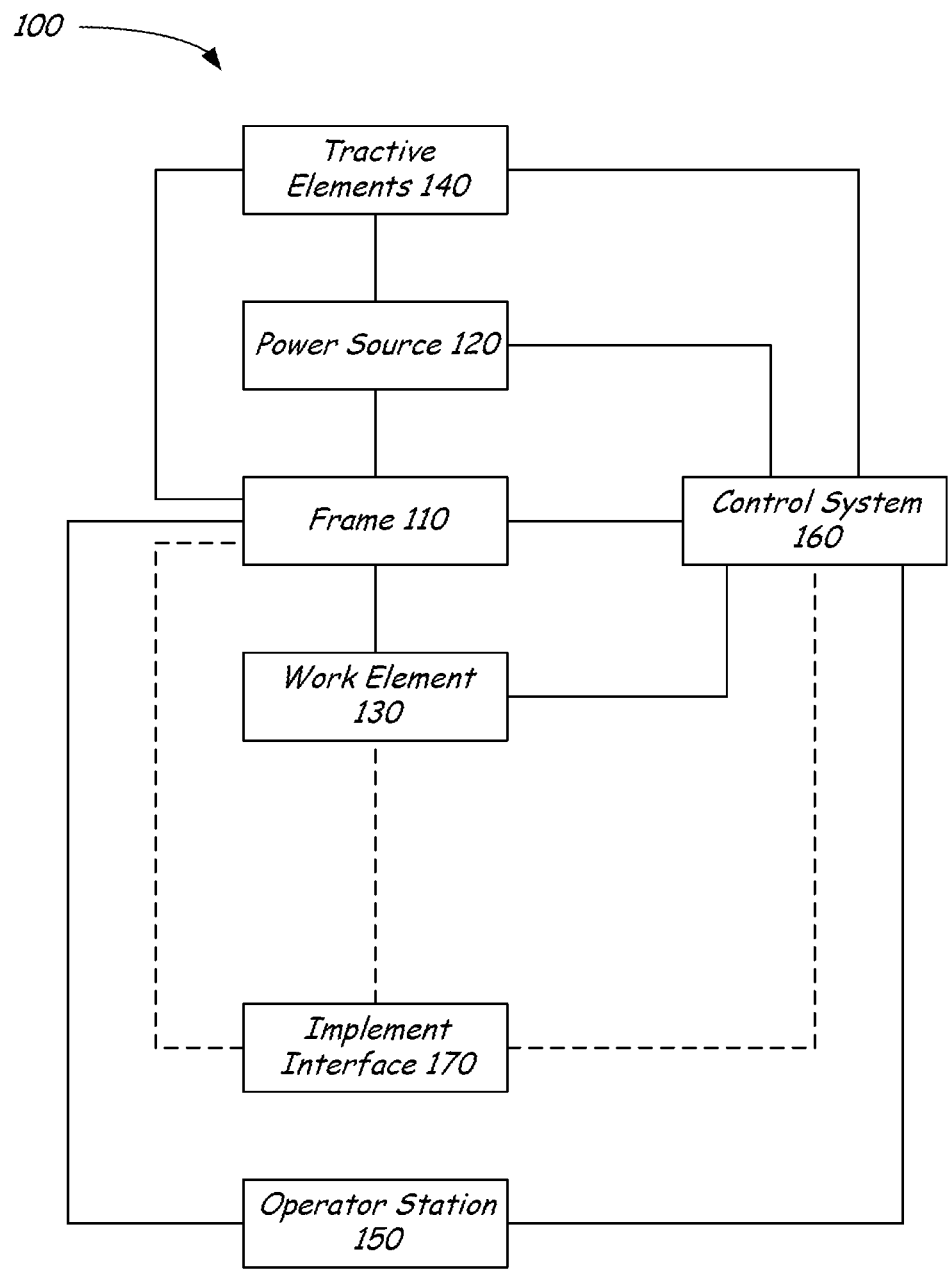
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

In some cases, work operations on one or more job sites may require, or at least benefit from, controlled operation of multiple power machines. For example, a power machine of a first type (e.g., an excavator) may be useful to execute certain operations on a job site (e.g., trenching or other digging), whereas a power machine of a second type (e.g., a loader) may be useful to execute certain other operations on the job site (e.g., transporting dirt from a spoil pile to a dump truck). Or it may be useful for a single user to be able to coordinate operation of multiple power machines of the same type (or different types), including for operation of multiple excavators, multiple loaders, etc. including, in some instances, controlling machines that are out of the line of sight or even in a remote location from the user.

Discussion herein of different "types" of power machines indicates power machines that have different overall functional configurations, as recognized by those of skill in the art. Thus, for example power machines configured as loaders are of a different type than power machines configured as excavators, as forestry power machines (e.g., feller-bunchers), as telehandlers, etc., and vice versa. Power machines of different types generally exhibit different workgroup configurations. For example, power machines configured as loaders may include a main lift arm configured for radial- or vertical-path movement, with workgroup actuators to separately control raising and lowering of the lift arm and changes in an attitude of an attached implement (e.g., a set of one or more lift actuators, and a set of one or more tilt actuators). In contrast, power machines configured as excavators may include a lift arm structure with a boom that pivotally supports a stick, with the stick in turn pivotally supporting an attached implement, and with workgroup actuators to control raising and lowering of the boom, pivoting of the stick relative to the boom, and changes in an attitude of an attached implement (e.g., with a set of one or more boom actuators, a set of one or more stick actuators, and a set of one or more tilt actuators). In this light, those of skill in the art will appreciate that control of different types of power machines typically requires different types of control inputs and outputs. Correspondingly, conventional operator interfaces may typically be configured for control of only a single type of power machine (e.g., with different operator interfaces for loaders and for excavators, respectively, including differently configured input devices for control of the different respective configurations of workgroup actuators or other work elements).

Some examples below focus in particular on remote control of a loader using an operator interface of an excavator. This may be useful, for example, so that operators of excavators can selectively remotely control a loader to assist in digging operations with the excavator (e.g., to scoop, transport, and then dump material that has been dug by the excavator). In other examples, however, other combinations of power machine types are possible, including implementations with remote control of an excavator using an operator interface of a loader, remote control of various types of machines that may provide a work function. In one example, a tamper (e.g., a plate compactor) can be controlled using an operator interface of a loader or an excavator, etc. Accordingly, unless otherwise indicated or required, discussion herein of examples that include particular types of power machines are intended to also disclose similar local and remote control with other combinations of power machines types.

Some embodiments of the disclosed technology can provide improved systems for control of multiple power machines by a single operator or from a single location. In particular, some embodiments can provide systems with which an operator can engage with a human-machine interface of an operator station of a first power machine (e.g., a joystick within a cab of the first power machine) to selectively control operations of the first power machine or of a second power machine. Thus, for example, some embodiments include control systems that allow an operator to control a first power machine and a second power machine by providing command inputs at an input device of the first power machine (e.g., while not providing any command inputs at a human-machine interface of the second power machine). In some embodiments, an operator can selectively operate in a local control mode, in which providing input commands via a joystick (or other device) in the cab of an excavator (or other type of power machine) can control operation of the excavator (or other machine), and in a remote control mode, in which input commands provided via the same joystick (or other device) can control operation of a loader (or other type of power machine). In different implementations, a second (remote) power machine (e.g., a loader) can be located at the same job site as a first (local) power machine (e.g., an excavator), or can be a located at a different job site. Correspondingly, remote control of a second power machine may or may not require line-of-sight communication with a first power machine, depending on the particular implementation. In some embodiments, the second power machine can be power machine that has an operator compartment with an HMI that a user can use to control the second power machine when it is not being controlled by the first power machine. In other embodiments, the second power machine may not be equipped with any HMI to control operation of the second power machine and may be completely reliant on commands from an external source or from a pre-programmed routine loaded into a control system of the second power machine.

Figure 2:
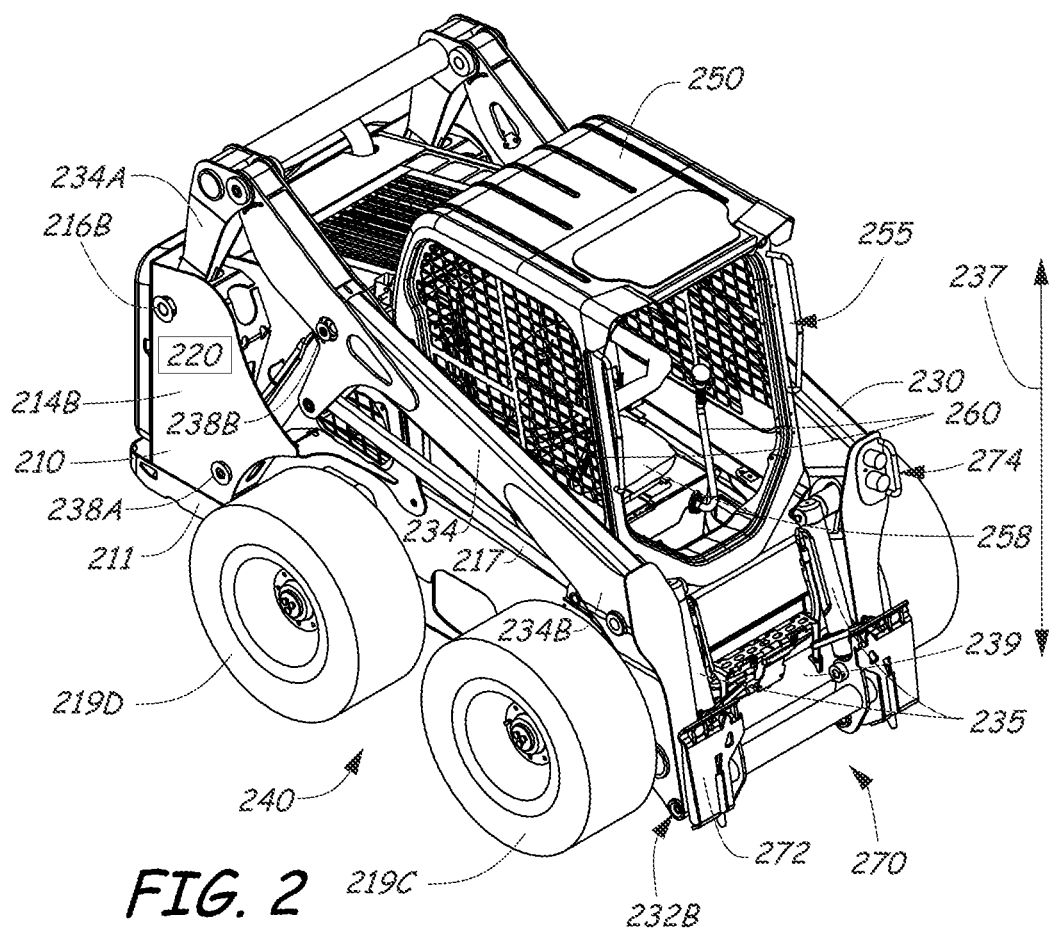
FIGS. 2-3 illustrate perspective views of a representative power machine in the form of a skid-steer loader of the type on which the disclosed embodiments can be practiced.
Figure 3:
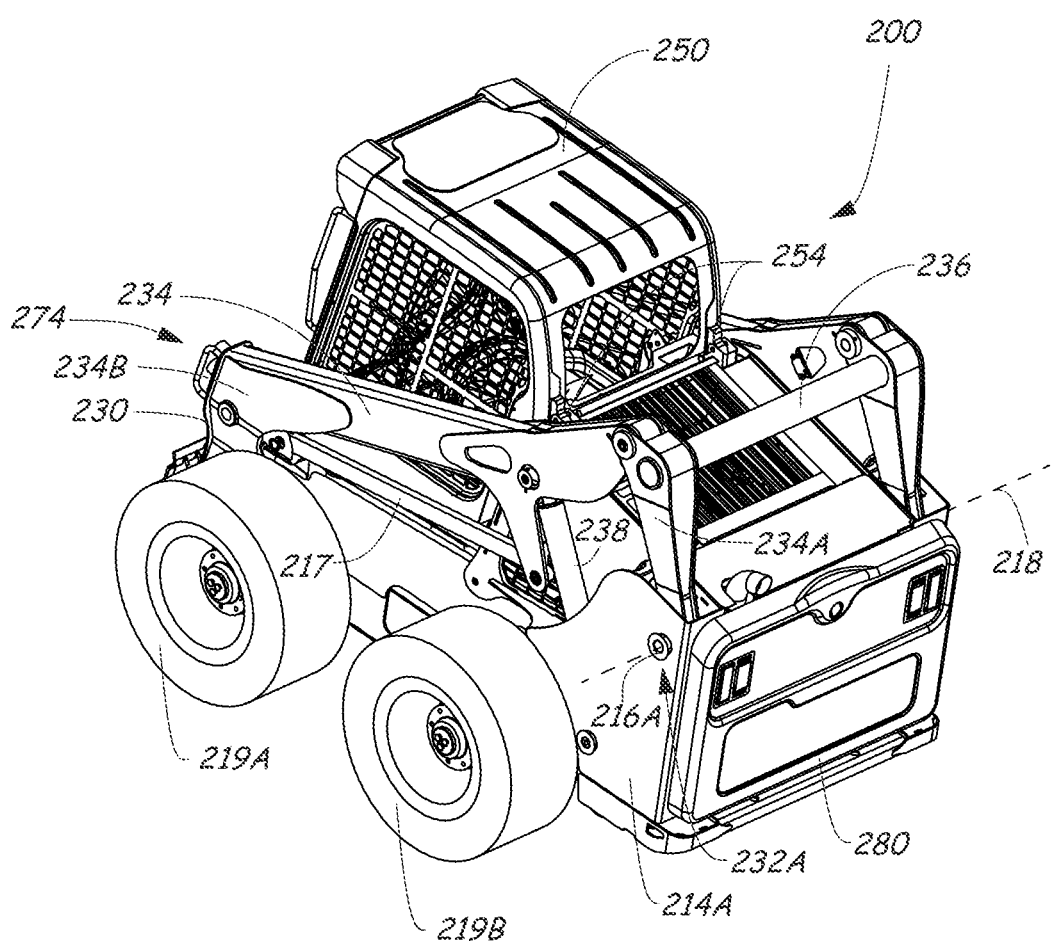

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator. As used herein, discussion of work tasks refers to sets of work operations (e.g., lifting, digging, etc.) using workgroup work elements (as further discussed below).

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame. In contrast to tractive actuators and other tractive work elements, workgroup actuators and other workgroup work elements are configured to provide powered movement of one or more components of a power machine for work operations (i.e., operations other than for travel of the power machine over terrain). Correspondingly, discussion of workgroup functions refers to one or more functions that relate to movement of one or more work elements or other components of a power machine, other than tractive elements or other components for travel of the power machine over terrain.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some embodiments disclosed herein can be implemented on a variety of other power machines. For example, some embodiments can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine. Among the functions that are controlled via operator input devices on power machine 200 include control of the tractive elements 219, the lift arm assembly 230, the implement carrier 272, and providing signals to any implement that may be operably coupled to the implement.

Loaders can include HMIs including display devices that are provided in the cab 250 to give indications of information relatable to the operation of the power machines in a form that can be sensed by an operator, such as, for example audible or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include or can interact with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators or an electronic controller on an implement. The implement power source 274 also exemplarily includes electrical conduits that are in communication with a data bus on the excavator 200 to allow communication between a controller on an implement and electronic devices on the loader 200.

Figure 4:
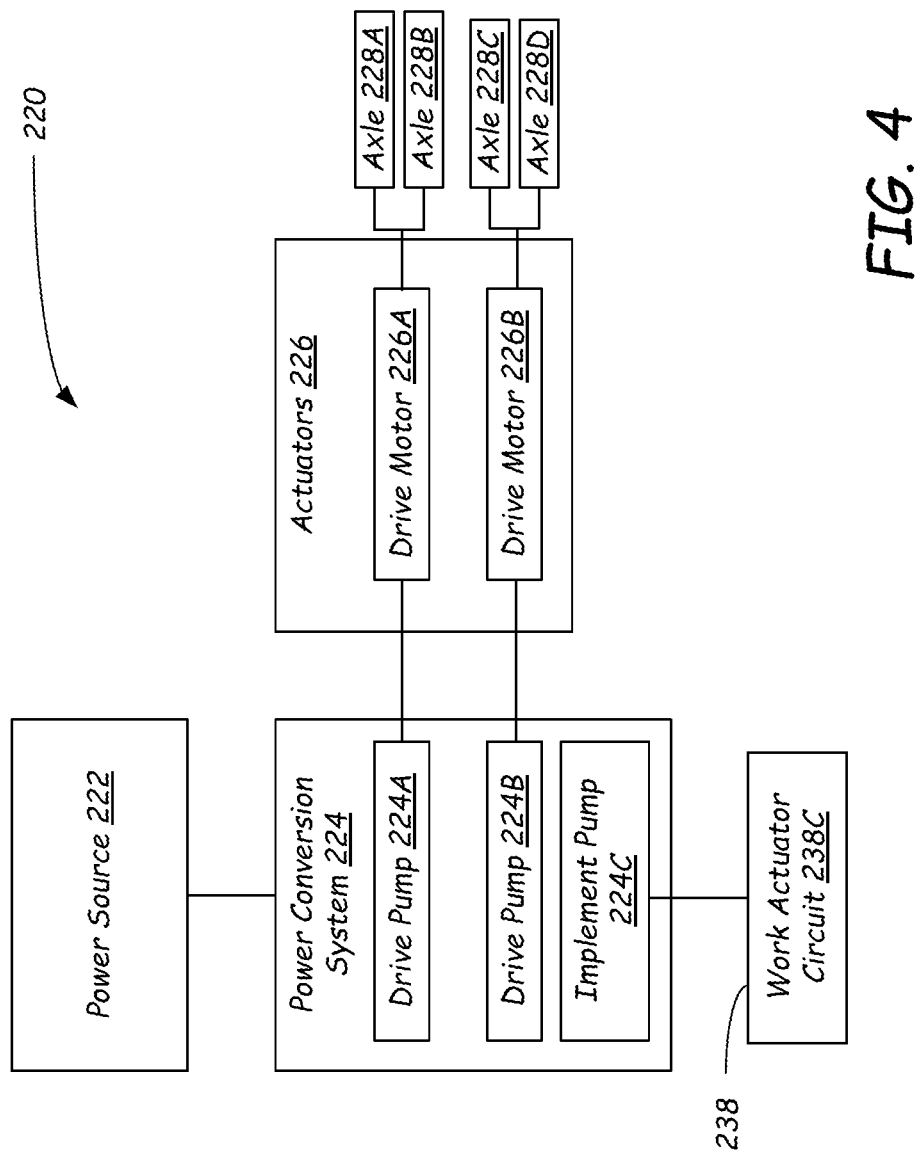
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders or tilt cylinders. In some machines, the work actuator circuit 238C also includes control logic to selectively provide a pressurized hydraulic fluid to an attached implement. The control logic of power machine 200 includes an open center, 3 spool valve assembly in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
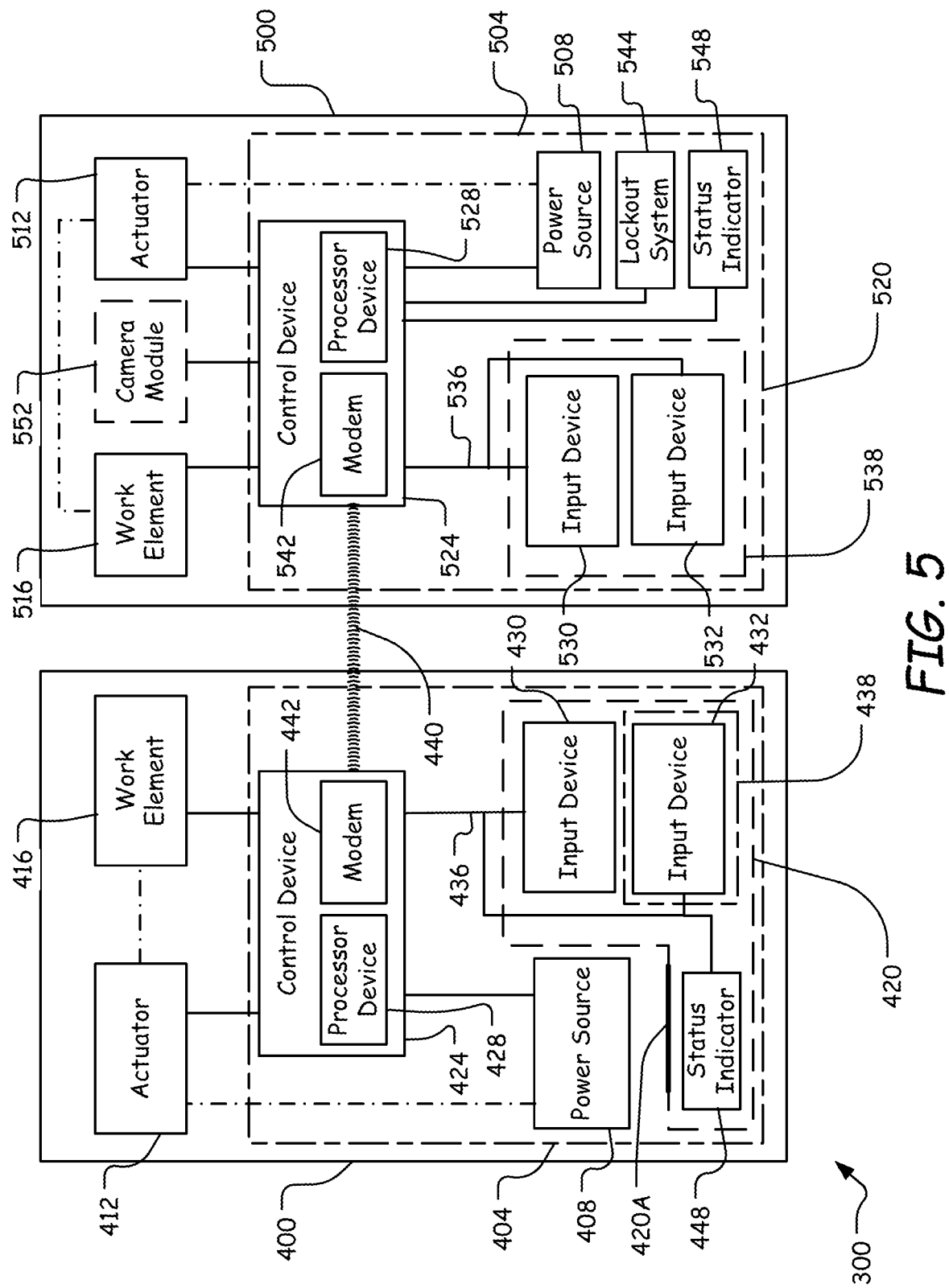
FIG. 5 is a schematic block diagram illustrating aspects of a control system for control of a first power machine and a second power machine according to embodiments of the present disclosure.

As noted generally above, some of the disclosed embodiments can allow a user input device (e.g., any known type of HMI) that is associated with a first power machine to be used to selectively control operations of the first power machine or a second power machine that is remote from the first power machine (e.g., spaced apart from and configured to move independently from the first power machine, without a mechanical tether between the two machines). In this regard, FIG. 5 shows a schematic illustration of a power machine system 300 in which a leader power machine (e.g., a first power machine) is configured to selectively remotely control one or more follower power machines (e.g., one or more second power machines). That is, the leader power machine can generally be used to selectively control the operation of the leader power machine or the operation of the one or more follower power machines.

More specifically, as will be discussed in greater detail below, the leader power machine can selectively operate in a local control mode or a remote control mode. In the local control mode, an input device of the leader power machine can be used to execute one or more power machine operations (e.g., control an actuator) of the leader power machine. In the remote control mode, the same input device of the leader power machine (alone or in combination with other input devices) can be used to execute one or more operations of a separate (e.g., spaced apart and not structurally tethered) follower power machine. In some cases, an operator may selectively (e.g., manually) switch between the local control mode and the remote control mode. In some cases, operation in local and remote control modes may not be mutually exclusive, and a set of power machines can be configured to operate in a hybrid control mode, wherein some inputs or operations are performed under a local control mode and others are performed under a remote control mode.

As illustrated, the power machine system 300 includes a leader (e.g., first) power machine 400, which can be any of a number of different types of power machines, including any of the types generally discussed above (e.g., wheeled or tracked skid-steer loaders, excavators, articulated loaders, etc.). Accordingly, the leader power machine 400 can generally include a frame 404 (e.g., a main frame of the power machine). The frame 404 can be configured to support various components of the leader power machine 400. In particular, in the illustrated example, the frame 404 can be configured to support a power source 408 (e.g., an engine or battery system), a work element 416, an actuator 412 (e.g., electric or hydraulic actuators, including rotary actuators, linear actuators, and combinations thereof) that are configured to articulate the work element 416, an operator station 420 (e.g., an enclosed cab), and a control device 424 (e.g., a general or special purpose computing device or a distributed system of such devices). Although only a single block is used to represent various components of the power machine 400 (and other components) in FIG. 5, it is contemplated that one or more of any of these components (e.g., actuators, work elements, etc.) can be included on any particular power machine.

The power source 408 can be configured to provide power to the various components of the leader power machine 400. In some embodiments, the power source 408 includes an internal combustion engine that can be configured to provide hydraulic and electric power to the various components either alone, or in combination with an electric power source such as a battery in a hybrid power source arrangement. In other embodiments, the power source 408 is an electrical power source, for example, a battery pack that includes one or more battery cells (e.g., lithium-ion batteries), or other electrical storage devices (e.g., capacitors). Accordingly, the power source 408 can be configured to supply power to operate the actuator 412, the work element 416, and the control device 424, as well as any other components of the leader power machine 400.

Relatedly, the control device 424 can be configured to control the operation of the one or more actuators 412 and the work element 416, as powered by the power source 408. In some cases, the control device 424 can be an integrated control device of the leader power machine 400, although some embodiments may include a control device with one or more components (e.g., dedicated computing devices) disposed remotely from the power machine. Correspondingly, the control device 424 can be implemented in a variety of different ways. For example, the control device 424 can be implemented as one or more known types of processor devices 428, (e.g., microcontrollers, field-programmable gate arrays, programmable logic controllers, logic gates, etc.), including as part of general or special purpose computers. In addition, the control device 424 can also include other generally known computing components, including memory, inputs, output devices, etc. (not shown), as appropriate. In this regard, the control device 424 can be configured to implement some or all of the operations of the control processes described herein, which can, as appropriate, be executed based on instructions or other data retrieved from memory. In some embodiments, the control device 424 can include multiple control devices (or modules) that can be integrated into a single component or arranged as multiple separate components. In some embodiments, the control device 424 can be part of a larger control system (e.g., the control system 160 of FIG. 1) and can accordingly include or be in electronic communication with a variety of control modules, including hub controllers, engine controllers, drive controllers, etc.

In different embodiments, the control device 424 can control the operation of a power machine in response to an input from an operator. As further detailed below, such control can sometimes be implemented for the leader power machine 400 in a local control mode or a follower power machine in a remote control mode. Generally, operator input can be provided via a human-machine interface that can relay a corresponding control signal to a relevant controller for further processing and, eventually, commanded control of one or more actuators. For example, as illustrated, the leader power machine 400 includes input devices 430, 432 (e.g., first user input devices), which can be supported by the operator station 420 (e.g., within a cab). In some embodiments, the input devices 430, 432 can be configured to allow an operator to send an input signal (i.e., a user input signal) over a CAN bus 436 (or otherwise) to the control device 424, to command operations of a power machine (e.g., the leader power machine 400 or a follower power machine).

In some embodiments, it can be beneficial to use an integrated input device of a leader power machine to control the leader power machine and a follower power machine. As used herein, an "integrated" input device is an input device that is non-removably included as part of an operator station of a power machine. For example, a factory-installed joystick for a loader that cannot (or is not intended to) be removed by a user during normal operation of the loader can be considered an integrated input device. Implementing control using integrated input devices can usefully permit an operator to use an input device that they are already comfortable with (i.e., for the leader power machine) to control a follower power machine. Further, use of an integrated input device can streamline operations because it may be possible to selectively implement local or remote control without requiring substantial physical changes to a control interface of an operator station that might not be easily implemented due to space constraints or ergonomic considerations. However, in some embodiments, removable input devices can be used, including as further discussed below.

In the illustrated example, the input device 430 (e.g., a first or primary input device) can be a mechanically actuatable input device (e.g., a joystick, pushbutton, switch, etc.) that is integrated with the leader power machine 400 (e.g., integrated with a seat, control panel, or other system within the operator station 420). Thus, for example, the input device 430 may sometimes be a joystick that is specifically configured to control workgroup or drive operations of the leader power machine 400. The input device 430 of the illustrated example communicates with (e.g., sends input signals to) the control device 424 via the CAN bus 436.

Other known communication modes or protocols can be used without departing from the scope of the disclosed embodiments.

In some implementations, removable input devices may be used. Use of removable input devices can be beneficial in some cases because they can provide input functionality that may allow a leader power machine to control functions of a follower power machine that cannot otherwise be controlled by an integrated input device of the leader power machine. For example, input devices for a loader (as a leader machine) may not necessarily provide sufficient degrees of freedom to control all desired operations of an excavator (as a follower machine). In this regard, for example, the input device 432 (e.g., a second input device) can be configured as a removable input device (e.g., a removable joystick or button assembly) that can be connected with the leader power machine 400 by an operator as needed. Correspondingly, the input device 432 can sometimes be coupled (e.g., electrically or physically) to the leader power machine 400 by a harness 438 that can receive part or all of the input device 432 to secure the input device 432 for operation and place the input device 432 in operational communication with the control device 424.

In some embodiments, the harness 438 can be configured to supply power to the input device 432 (e.g., via a 12 volt connection in a cab or the operator station 420) or to allow the input device 432 to connect to the CAN bus 436 or other data systems to send input signals to the control device 424. In other implementations, a removeable input device may be configured for wireless communication with a control device (e.g., a control device of a leader power machine or a follower power machine). For example, a removable input device may be configured as a mobile computing device (e.g., a cell phone) or may include known wireless communication modules to allow wireless communication with a control device of a relevant power machine. In some cases, a mount (e.g., as shown schematically via the illustrated block 438 for the harness) can be provided to allow an operator to secure a removeable input device to the power machine during use (e.g., an operator station, cab, or frame).

Although the input devices 430, 432 can generally be used to control operations of the power machine 400, the input signals from the input devices 430, 432 can be selectively interrupted by the control device 424 depending on the selected control mode. For example, if the leader power machine 400 is in a local control mode, the input signals from the input devices 430, 432 can be used to execute a power machine operation of the leader power machine 400. However, if the leader power machine 400 is in a remote control mode, as further discussed below, the leader power machine 400 can send a wireless control signal 440 to a follower power machine in response to input signals at one or more of the input devices 430, 432, in order to execute a power machine operation of the follower power machine. Accordingly, to prevent inadvertent or otherwise undesired operation, the control device 424 may sometimes interrupt control of the power machine 400 based on the input signals.

Generally, to allow the leader power machine 400 to communicate with and control a follower power machine, the control device 424 can sometimes include a modem 442 configured for sending and receiving wireless communication. In some embodiments, the modem 442 can be configured for 5G cellular communication. In some embodiments, a modem can be configured differently, for example, to allow Wi-Fi, Bluetooth, or other wireless communication.

With continued reference to FIG. 5, the power machine system 300 is configured so that inputs at the leader power machine 400 can selectively remotely control a follower power machine 500, including via inputs received at the same input device(s) that can be used to locally control the leader power machine 400. Generally, the follower power machine 500 can be the same type of power machine as the leader power machine 400 (e.g. both the leader power machine 400 and the follower power machine 500 can be wheeled skid-steer loaders), or the leader and follower power machines 400, 500 can be different types of power machines (e.g., the leader power machine 400 can be an excavator and the follower power machine 500 can be a wheeled loader, or vice versa). As illustrated, and similar to leader power machine 400, the follower power machine 500 can generally include a frame 504 that can be configured to support a power source 508, an actuator 512 (e.g., electrical or hydraulic actuators, including rotary actuators, linear actuators, and combinations thereof) configured to articulate a work element 516, an operator station 520 (e.g., a cab), and a control device 524 for controlling one or more operations of the follower power machine 500 (e.g., controlling the actuator 512 or the work element 516). Likewise, the control device 524 can include one or more processor devices 528 and a modem 542 (or other wireless communication device) for sending and receiving wireless signals 440 to and from the leader power machine 400 (or other remote system).

In some embodiments, the follower power machine 500 can be remotely operated by an operator in the leader power machine 400, and can also (e.g., selectively) be locally controlled by an operator of (e.g., in a cab of) the follower power machine 500. Accordingly, the follower power machine 500 can include input devices 530, 532 (e.g., integrated input devices or removeable input devices optionally connected by a harness 538) configured to control the follower power machine 500 (or another power machine). Generally, the input devices 530, 532 can provide an input signal to the control device 524 over a CAN bus 536 or wirelessly to command particular power machine operations (e.g., movement of the actuator 512). Although the embodiment shown in FIG. 5 illustrates a follower power machine 500 with input devices 530 and 532, and various features related to a follower power machine having such input devices are described herein, in some embodiment, the follower power machine may not have such inputs and operational control may only be accomplished via remote control, via an autonomous control system resident on the follower power machine, or a combination of both.

In some cases, a follower machine may include a lockout system (e.g., lockout device) that can limit (e.g., prevent) remote control of the follower machine unless certain lockout conditions are met. Thus, for example, undesirable remote operation of the follower machine can be generally avoided. For example, to prevent remote control of the follower power machine 500 when the follower power machine 500 is being locally operated by another operator (in instances where the follower power machine is equipped and configured for local operation) or otherwise not prepared for remotely controlled operation, the follower power machine 500 can include a lockout system 544 configured to control whether or not remote control of the follower power machine 500 is permitted. The lockout system 544 can be configured to prevent remote control of the follower power machine 500 unless the lockout system 544 is disabled or otherwise configured to allow remote control by the leader power machine 400. As one example, and as further discussed below, the lockout system 544 can be configured to prevent remote control of the follower power machine 500 unless the power machine 500 satisfies one or more physical state conditions (e.g., particularly input devices have been manually actuated, particularly safety systems are in a particular state, etc.).

In some cases, the follower power machine 500 can be configured to convey status information to bystanders that the follower power machine 500 is being remotely operated or is ready for operation in a remote control mode. For example, the follower power machine 500 can include an indicator device 548 (e.g., a lighting device, mechanical flag, general purpose display device, etc.) that is configured to provide a status indicator. The indicator device 548 can be configured to emit visual or audible signals to indicate that the follower power machine 500 is or can be remotely operated. In particular, the indicator device 548 may include a light or beacon (e.g., mounted to the outside of a frame or cab) that can flash in various patterns or sequences or change color depending on a current mode of operation. Additionally, or alternatively, the indicator device 548 can be configured to emit an audible beep or other noise, which may be emitted in different patterns or sequences to indicate the current mode of operation. Relatedly, the leader power machine 400 may also be configured to indicate or show an operator that the leader power machine 400 is in a remote control mode. Accordingly, the leader power machine can include an indicator device 448 (e.g., a light), which may be provided in the operator station 420 and operated by the processor device 428 to provide a status indicator that can communicate to an operator information associated with a current mode of operation (e.g., to indicate operation in a remote control mode, a local control mode, or a hybrid control mode).

With appropriately configured communication devices (e.g., the modems 442, 542), a follower power machine can be remotely operated at any distance away from a leader power machine. For example, the follower power machine 500 can be remotely operated within a line of sight of an operator positioned in the operator station 420 of the leader power machine 400. Alternatively, the follower power machine 500 can be remotely operated when it is located beyond a line of sight of the operator.

In some cases, to facilitate effective remote operation, including for operation beyond a line of sight of an operator, the follower power machine 500 can have a camera module 552 having one or more cameras (e.g., visual-spectrum video cameras) mounted to the frame 504, the operator station 520 (e.g., a cab), or any other appropriate part of the follower power machine 500. The camera(s) of the camera module 552 can be selectively placed on the follower power machine 500 by an operator, or they may be fixedly mounted to the follower power machine 500 in specific locations, for example, to provide an operator with a view of a work area for an implement or to provide a 360-degree field of view around the follower power machine 500. In some embodiments, four cameras are provided to show views in front of, behind, to the left and to the right of the machine. Other or additional camera arrangements and angles can be used to provide specific views that might be advantageous for an operator of the leader machine to see. The camera module 552 can be configured to send a video signal to the leader machine 400 for display by the leader machine 400. For example, the camera module 552 can transmit a video signal directly to the leader machine 400 or can transmit a video signal to the control device 524, which can then transmit the video signal (e.g., via wireless signal 440) to the leader power machine 400. Correspondingly, the leader power machine 400 can include a screen or heads-up display to allow the operator to view the video feed from the camera module 552, including as may be provided on one or more input devices of the power machine 400. In some embodiments, as shown schematically in FIG. 5, the leader power machine 400 can include a window 420A (e.g., part of a door or windshield of the operator station 420) on which the control device 424 can cause display of a video that is received from the follower machine 500.

In some implementations, devices or systems disclosed herein (e.g., as discussed relative to FIG. 5) can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Figure 6:
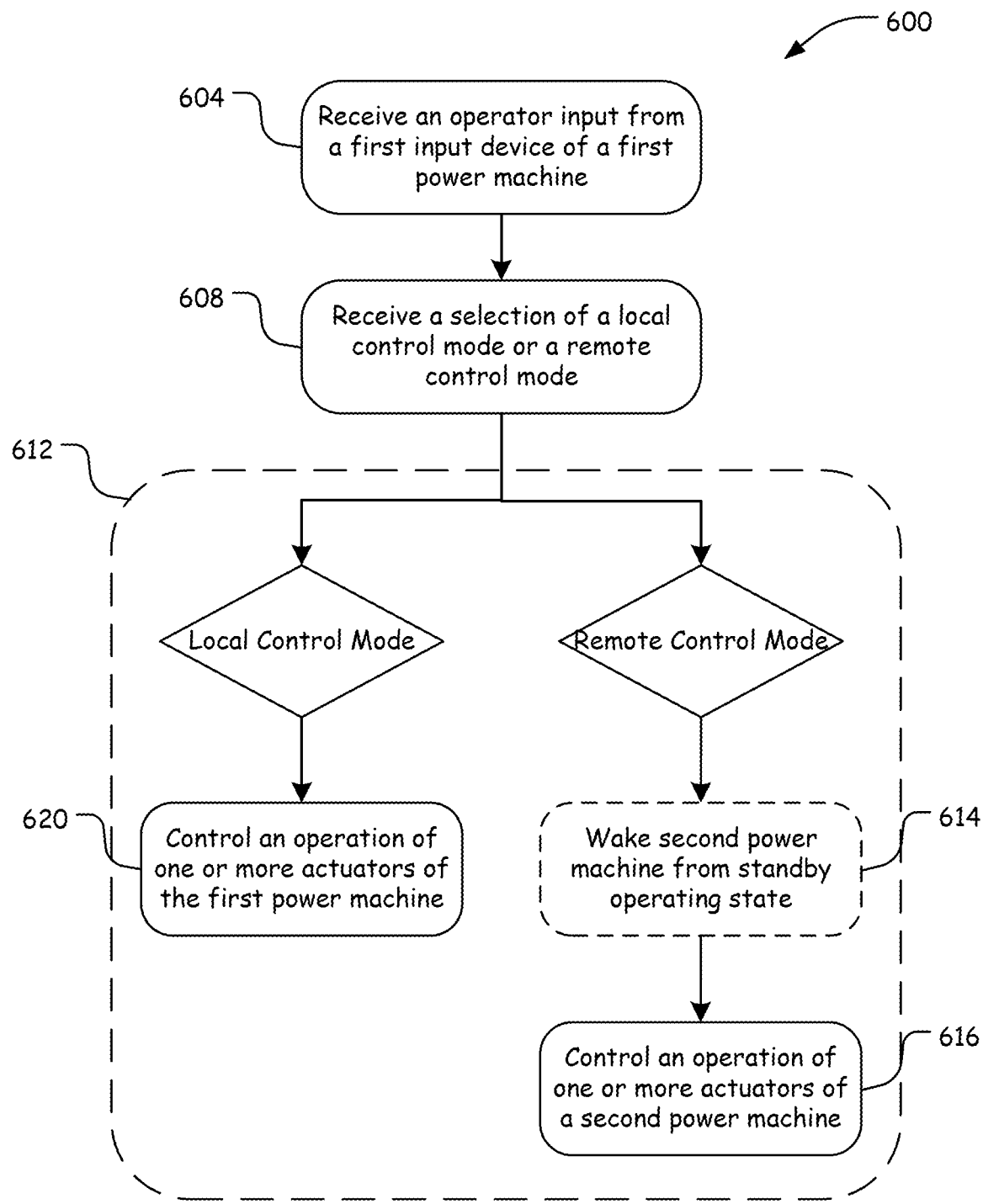
FIG. 6 is a flow chart diagram of an example method for controlling multiple power machines according to embodiments of the present disclosure.

In this regard, with additional reference to FIG. 6, a method 600 of operating a power machine system is illustrated, according to some aspects of this disclosure. While the method 600 will be discussed in reference to the power machine system 300, the method 600 is also applicable to other power machine systems not expressly discussed herein (e.g., as may include differently configured leader or follower power machines). Additionally, operations of the method 600 need not be carried out in the specific order discussed below and may in some cases be implemented by local, remote, or a combination of local and remote processor devices.

At block 604, the method 600 can include a control device (e.g., of a leader power machine) receiving an operator input. The operator input may be provided by an operator interacting with an input device (e.g., an integrated or removable input device) of the leader power machine to generate an input signal. For example, an operator located within the operator station 420 of the leader power machine 400 can manipulate or otherwise interact with the integrated input device 430 to generate an input signal. The input signal can then be transmitted via the CAN bus 436 to the control device 424. In some cases, an input signal can also be provided by a removeable input device, for example, the removable input device 432, which may send a corresponding input signal to the control device 424 via the harness 438 and the CAN bus 436. In other embodiments, a removeable input device can be configured to communicate wirelessly and may or may not be electrically coupled with a leader power machine.

At block 608, a control device of a first, leader power machine can receive a selection of a local control mode or a remote control mode. In some cases, the leader power machine 400 may require an affirmative action by an operator to enable a remote control mode. For example, an operator of the leader power machine 400 may be required to interact with one of the input devices 430, 432 to select a remote control mode or a local control mode (e.g., only one of the modes). More specifically, the input devices 430, 432 can include a button (e.g., a button provided on a joystick), toggle, switch, or other interface to allow the user to select between a local control mode or a remote control mode. The selection made by the user can be communicated to the control device 424, and more specifically the processor device 428, for example, via the CAN bus 436. That is, the input devices 430, 432 can produce a control signal corresponding to a selected mode of operation, which can be sent to the control device 424. In other embodiments, a processor device may automatically select a mode of operation based on a control signal or on a source of a control signal or may receive a selection of a mode of operation from other input devices or systems.

In some cases, in particular, when an operator has selected the remote control mode via the input devices 430, 432 (or a remote control mode has been otherwise selected), operations at block 608 can further include establishing a communication link with the follower power machine 500 (i.e., initiating the link, or sending an initiation signal via an already connected but dormant link). For example, when the control device 424 receives a control signal to operate in the remote control mode, the control device 424 can initiate a communication link (e.g., a wireless communication link or channel) with the follower power machine 500 to allow wireless signals 440 to be transmitted between the leader power machine 400 and follower power machine 500. The wireless signals 440 may contain any type of data and can be sent using any type of communication protocol, for example, a standardized communication protocol or a proprietary communication protocol.

Relatedly, an operator may need to be pre-authorized to remotely control the follower power machine 500 using an input device of the leader follower machine 400. In that regard, for example, an operator may be prompted by the control device 424 to select the follower power machine 500 from a list of pre-authorized follower power machines, or otherwise indicate that remote control of the power machine 500 is authorized. The prompt may be displayed to the operator at one of the input devices 430, 432 (e.g., via a touch screen mounted in the operator station 420), or at another device, for example, a mobile device that can send a corresponding authorization signal to the processor device 424 (or to the power machine 500).

Where a pre-authorization is required, if the follower power machine 500 is not pre-authorized, the control device 424 may terminate the request by the user to operate the follower power machine 500 in the remote control mode (e.g., in response to a corresponding signal sent by the follower power machine 500 or an input device 430, 432). Accordingly, the control device 424 may be configured to display a message or otherwise indicate to the operator (e.g., via the input device 430, 432 or another device) that remote control of the follower power machine 500 is unavailable or being prevented. Where remote control is not allowed, the leader power machine 400 may be configured to revert or default to the local control mode, including automatically selecting the local control mode. However, in some cases, an operator may be required to manually select operation in the local control mode, rather than operate in that mode as a default.

Relatedly, operations at block 608 can also include determining whether remote control of the follower power machine 500 is enabled at the follower power machine 500. For example, a control device on the leader or follower power machine 400, 500 may be configured to determine whether the lockout system 544 is in an appropriate state to allow remote operation of the follower power machine 500 via the leader power machine 400. For example, in some cases, the lockout system 544 may require that the follower power machine 500 be put into a particular physical state (i.e., matches a particular physical state condition) to allow for remote control. More specifically, to permit remote control, the lockout system 544 may require that, in the follower power machine 500: an ignition be turned off, a lap bar be placed in an "up" position, a door of a cab be in a closed position, a remote control button be pushed, other operator presence indicator be in a non-activated state, a key be inserted (e.g., and turned to a standby or activated position), one or more user inputs may be used to unlock a machine's functions (in the case of keyless machines), or any combinations thereof.

If the lockout system 544 is not engaged or is otherwise in a state that does not allow for remote control, the follower power machine 500, and more specifically, the processor device 528 of the control device 524 can be configured to send a corresponding signal (e.g., a termination signal) to the control device 424 of the leader power machine 400. In response to this signal, the control device 424 of the leader power machine 400 can be configured to terminate the communication link and to display a message or otherwise indicate to the operator (e.g., via the input device 430, 432 or another device) that remote control of the follower power machine 500 is unavailable.

Conversely, if the lockout system 544 is engaged or otherwise in a condition to allow remote control, the follower power machine 500, and more specifically, the processor device 528 of the control device 524, can send a corresponding wireless signal 440 (e.g., a confirmation signal) to the control device 424 of the leader power machine 400. Accordingly, the control device 424 of the leader power machine 400 can be configured to display a message or otherwise indicate to the operator (e.g., via the input device 430, 432, the status indicator 448, or another device) that remote control of the follower power machine 500 is available or has been established. In some embodiments, however, these or other conditions may or may not be required to allow remote control of a follower power machine by a leader power machine.

In some cases, a power machine that is to be remotely controlled may be in a standby state, in which the power machine is not enabled to executed powered operations with one or more work elements. For example, a power machine in a standby mode may be unpowered, except as needed to initially establish a communications link, verify authorization, etc., as described above, or may be otherwise configured so that powered operation of workgroup elements, tractive elements, or other components may not be permitted. Thus, for example, for a power machine in standby mode, an engine or other power source may not be operating or operationally connected to various actuators of the power machine to power operation thereof. As another example, an engine or other power source may be operating but a control system of the power machine may be configured to prevent use of power from the power source to power one or more actuators of the power machine or to execute one or more particular power machine operations (e.g., operations with a lift arm or implement, or other workgroup operations).

Correspondingly the method 600 can include waking the remote (e.g., second) power machine from the standby state. For example, as illustrated at optional block 614 in FIG. 6, once a selection of a remote-control mode has been received and a communications link has been established between the first and second power machines, the second power machine can be woken from a standby state so that the second power machine can be remotely controlled for various power machine operations. In some cases, the second power machine can be woken at block 614 immediately in response to the establishing of the communications link between the power machines. For example, a valid authenticating handshake or other initial communication between the power machines can cause the control system of the second power machine to enable operation of particular work operations or work elements on the second power machine.

In some cases, a power machine may be woken from a standby state only by another power machine that has previously established a control connection with the power machine to be woken (e.g., has been previously authenticated or otherwise authorized for remote control of the relevant remote power machine). In some cases, a power machine to be woken may authenticate the identity or permissions of another power machine based on transmissions between the power machines to establish a communications link (e.g., as discussed relative to block 608), or may authenticate the other power machine based on other transmissions once a communications link has been established (e.g., an exchange of credentials after an initial handshake, to authorize the starting of an engine of the power machine to be woken, etc.). In some cases, other state conditions may be similarly required to authorize establishing a communication channel between two power machines, or remotely controlling a power machine in general. For example, a power machine to be remotely controlled may be woken only if a physical key is present (or activated) for the power machine, or subject to other physical state indicators as discussed above.

As also generally discussed to above, waking the second power machine from a standby state (e.g., at block 614) can cause the second power machine to enable execution of operations that were not enabled in the standby state (e.g., workgroup operations that were not powered or not permitted by a control system in the standby state). Thus for example, waking the second power machine can include starting a power source of the second power machine, causing the second power machine to operatively connect the power source to a work element of the second power machine, or otherwise causing an electronic control system of the second power machine to enable (e.g., permit) particular operations that were not possible in the standby state.

Correspondingly, as one potential implementation, a loader (or other power machine) may be in a standby state with an engine of the loader not operating, or an electrical power of the loader not operationally connected so as to power workgroup or tractive actuators of the loader. An operator of a different power machine configured as an excavator (or otherwise) can thus control the excavator to execute various excavator work operations, without the loader expending fuel or draining battery power and with the loader spaced apart from the excavator so as not to interfere with the excavator operations (e.g., parked outside a relevant work zone). Once the loader is needed, the operator can then select a remote control mode via a control interface of the excavator, as corresponds to remote operation of the loader. This selection can cause the control system of the excavator to establish a wireless communication link with the loader (as needed), and the communication link can then be used to command the loader to wake from the standby state (e.g., to start an engine, enable hydraulic flow to a relevant hydraulic actuator, or enable flow of electrical power from a battery to a relevant electrical actuator). The loader can then be controlled for work operations by the operator, from the cab of the excavator, as further detailed above and below.

Continuing, as mentioned above, in some cases a follower power machine may be provided with a camera module to allow for effective operation of a follower power machine, including for operation beyond a line of sight of the operator in the leader power machine. In some cases, a camera module can also be used even when the follower power machine is within the line of sight of the operator in the leader power machine, as may improve the ability of the operator to control the follower power machine where precision movements of a work element are required.

In any case, as desired, operations based on a received selection of a control mode at the block 608 can further include initiating a video feed of the camera module 552 (see FIG. 5), so that a video signal can be transmitted via the wireless signal 440 (e.g., communication link) to the processor device 428 of the leader power machine 400. Correspondingly, the processor device 428 can be configured to display the video feed to the operator, for example, by powering a screen or projecting the video feed onto a window or window panel on a door of the leader power machine 400 (e.g., the window 420A).

In some cases, if a camera module is provided but a video feed cannot be established (or terminates) before remote control is otherwise ceased, the processor device 428 may be configured to terminate or disallow operation under the remote control mode. Correspondingly, the input devices 430, 432 may be configured to allow the operator to override these aspects, for example, to allow continued operation of the follower power machine 500 when it is within a line of sight of the operator.

Where a mode of operation is selected (and enabled, as appropriate), a control device can be configured to execute or control an operation of a power machine at block 612 based on input received at a leader power machine at block 604. In particular, where the control device 424 of the leader power machine 400 is operating under the remote control mode according to block 608, the control device 424, and more specifically the processor device 428, can be configured to control a power machine operation (e.g., a drive or workgroup operation) of the follower power machine 500 at block 616. For example, the control device 424 can control the actuator 512, based on a control signal from the leader power machine 400 (as based on operator inputs at the leader power machine 400), to move the work element 516 relative to the frame 504 of the follower power machine 500. More specifically, the processor device 428 can receive a control signal from the operator via one or both of the input devices 430, 432 and can send corresponding command signals for operation of the actuator 512.

In some cases, it is possible that the leader power machine 400 may not necessarily be "on" (e.g., in an "engine on" state) to operate the follower power machine 500 in the remote control mode. In some cases, a leader power machine may only be permitted to control a specific power machine operation or subset of power machine operations of a follower power machine. In other cases, a leader power machine may be permitted to control any power machine operation of a follower power machine.

As one particular example of operation in a remote control mode, the operator may manipulate a joystick or push a button, which then transmits a control signal to the control device 424, where the control signal can be interrupted by the processor device 428 (e.g., based on a temporarily updated address scheme for CAN bus communication). Accordingly, the processor device 428 can generally prevent the control signal from being executed by the leader power machine 400, although this may not always be the case. The processor device 428, in accordance with the selected remote control mode, can be further configured to send a corresponding wireless signal 440 to the follower power machine 500 to execute the desired power machine operation with the follower power machine 500.

Continuing, in some cases, a control device (e.g., either of the processor devices 428, 528) can be configured to translate (e.g., remap) a control signal produced by the input devices 430, 432 to correspond with a control signal for actuators of the follower power machine 500, which may differ from actuators of the leader power machine 400 that would be controlled by that same control signal under a local control mode. In particular, where the control signal is a CAN signal, re-mapping of the control signal can include modifying one or more bits of the CAN signal, for example, to modify a CAN address or other aspect of the CAN signal. In other cases, the processor device 428 can be configured to re-route a control signal produced by the input devices 430, 432 to the follower power machine 500. In either case, the processor device 528 may receive the corresponding wireless signal 440 and use it to execute the desired power machine operation of the follower power machine 500. However, in yet other cases, the processor device 428 can be configured to directly control the actuators 512 or work element 516 of the follower power machine 500 using the control signal from the input devices 430, 432 to execute the desired power machine operation. In still other cases, a control signal produced by the input devices 430, 432 that does not have a corresponding function on the follower power machine 500 may be stopped or terminated at the processor device 428 (or otherwise). Moreover, in some embodiments in which a removeable input device or other type of input device (e.g., a mobile device) is provided, the removeable device may be configured to communicate directly with a follower power machine.

When the leader power machine 400 is operating under a local control mode based on the received selection at block 608, the control device 424, and more specifically, the processor device 428, can be configured to control a power machine operation of the leader power machine 400 at block 620, for example, by controlling the actuator 412, based on a control signal from the leader power machine 400, to move the work element 416 relative to the frame 404 of the leader power machine 400. In particular, the processor device 428 can receive a control signal from the operator via one or both of the input devices 430, 432 (e.g., by the operator manipulating a joystick or pushing a button). Accordingly, the processor device 428 can be configured to use the control signal to carry out the power machine function. Carrying out the power machine function may, for example, include the processor device 428 directly controlling the actuator 412, or using the control signal to send one or more corresponding signals to one or more control modules or other control devices of the leader power machine 400.

As also mentioned above, the power machine system 300 may not always operate exclusively in only the remote control mode or only the local control mode. Rather, in some cases, a leader power machine 400 can be configured to operate in a hybrid control mode at block 612, in which some control signals can be carried out under only the remote control mode or only under the local control mode, or under both the remote control mode and the local control mode at the same time. For example, the leader power machine 400, configured as an excavator, may control the follower power machine 500, configured as a loader. Accordingly, the leader power machine 400 may include input devices 430, 432, for example, foot pedals, which have no corresponding control or input device on the follower power machine 500. In this case and similar other cases, although the processor device 428 of the leader power machine 400 could be configured to terminate or ignore the un-mapped or unused control signals, the processor device 428 could alternatively be configured to allow the un-mapped or unused control signals to pass through to execute a corresponding power machine operation of the leader power machine 400. In some embodiments, such operational schemes can be used regardless of the type of power machines being used as the leader power machine 400 and the follower power machine 500.

In some cases, the leader power machine 400, and more specifically, the processor device 428 of the leader power machine 400, can be configured to cause continued operation of the follower power machine 500 under the remote control mode (e.g., a semi-autonomous control mode), while the operator actively uses the input device 430, 432 to control the leader power machine 400 under the local control mode. As one particular example, an operator might enable a "lock" function before switching from the remote control mode to the local control mode, which would set the follower power machine 500 to continue operating according to a particular (e.g., current) set of parameters. This could be used, for example, to direct somewhat autonomous, remotely initiated operations, including low-speed, straight-line concrete cutting, repeatable tasks (e.g., scoop-and-dump operations, etc.), or other low-speed or simple tasks. In some cases, a "lock" function could lock the follower power machine 500 into a repeated sequence of actions (e.g., a pre-recorded scoop-and-dump operation that includes repeated travel between a spoil pile and a dump truck). In that regard, the processor device 428 can be configured to send out a repeated sequence of wireless signals 440 to control the follower power machine 500, or can send an initial signal that places the power machine 500 into a particular operational mode or sequence of operations. Relatedly, the processor devices 428, 528 may be preprogramed to execute one or more pre-recorded or pre-programmed (i.e., "canned") routines. In some cases, a pre-recorded or canned operation may be stored on the follower power machine 500 so that the routine can be executed by the processor device 528 without continued (or continuous) input from the leader power machine 400.

Thus, under some embodiments of the disclosure, an operator can usefully operate multiple power machines using a common input device, including an input device that may be integrated into or otherwise associated primarily with (e.g., operably connected to) a leader power machine. In some cases, for example, an operator can use an integrated joystick of an operator station of a leader power machine to locally control operations of the leader power machine and to remotely control operations of a follower power machine. Accordingly, for example, a single operator may be able to execute complex or other multi-machine tasks without having to leave the confines of a cab or operator station of a leader machine, or having to otherwise directly (e.g., manually) interface with input devices of the follower machine.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of" "only one of" or "exactly one of."

Although the present invention has been described by referring to certain preferred embodiments, workers skilled in the art will recognize that changes may be made in form and detail without departing from the scope of the discussion.

What is claimed is:

1. A power machine system comprising:
    a first power machine, including:
        a first main frame;
        a first workgroup work element movably supported by the first main frame;
        a first power source;
        a first actuator arranged to receive power from the first power source to move the first workgroup work element relative to the first main frame;
        a first user input device supported by the first main frame and configured to transmit control signals based on inputs provided by a user at the first user input device; and
        a first control device;
    the first control device including first one or more processor devices configured to:
        receive, from the first user input device, a control signal corresponding to a power-machine operation; and
        cooperatively control execution of the first power machine and a second power machine to complete a work task, selectively under either of:
            a local control mode, in which the first control device controls the first power machine via the first actuator, based on the control signal, to move the first workgroup work element relative to the first main frame; or
            a remote control mode, in which the first power machine controls the second power machine via the first control device transmitting a wireless signal to a second power machine, based on the control signal, to control operation of a second actuator of the second power machine to move a second workgroup work element relative to a second main frame.

2. The power machine system of claim 1, wherein the first control device is configured to receive and display a video transmission from the second power machine under the remote control mode.

3. The power machine system of claim 1, wherein the first user input device includes a joystick integrated with an operator station of the first power machine.

4. The power machine system of claim 1, wherein the first user input device is operably connected to a CAN bus of the first power machine to transmit the control signal to the first one or more processor devices via the CAN bus.

5. The power machine system of claim 1, wherein the first power machine includes a harness adapted to removably receive the first user input device to place the first user input device in operational communication with the first control device.

6. The power machine system of claim 1, wherein the first user input device is configured to allow a user to select between the local control mode and the remote control mode.

7. The power machine system of claim 1, wherein the first one or more processor devices are configured to provide a first status indicator to indicate to the user which of the local control mode and the remote control mode the first control device is operating under.

8. The power machine system of claim 1, wherein the second power machine is configured to provide a second status indicator to indicate operation of the second power machine under the remote control mode.

9. The power machine system of claim 1, wherein the first power machine is a first type of power machine and the second power machine is a second type of power machine, different from the first type.

10. The power machine of claim 9, wherein the first power machine is an excavator and the second power machine is a loader.

11. A control system for a first power machine with a first actuator and a second power machine with a second actuator, the control system comprising:
 a first user input device, integral with a first operator station of the first power machine; and
 one or more processor devices configured to:
  receive a first user input via the first user input device;
  determine a control mode for cooperative execution of a work task that corresponds to the first user input; and
  control the first power machine and the second power machine to cooperatively execute the work task based on the determined control mode and the received first user input;
 wherein controlling the first power machine and the second power machine selectively includes:
  in a local control mode, controlling the first actuator of the first power machine, based on the received first user input, to execute the work task with the first power machine; and
  in a remote control mode, controlling the second actuator of the second power machine via the first power machine, based on the received first user input, to execute the work task with the second power machine; and
 wherein controlling the second power machine further includes selectively preventing operation of the second power machine.

12. The control system of claim 11, wherein the second power machine includes a lockout system configured to selectively prevent operation of one or more actuators of the second power machine in the remote control mode.

13. The control system of claim 11, wherein the one or more processor devices are configured to control the second actuator in the remote control mode simultaneously with controlling the first actuator in the local control mode based on the received first user input.

14. The control system of claim 13, wherein the one or more processor devices are configured to control the second actuator according to a predetermined operational routine while simultaneously controlling the first actuator of the first power machine based on the received first user input.

15. The control system of claim 14, wherein the predetermined operation routine is determined based on a second user input received via one or more user input devices of the first power machine.

16. The control system of claim 11, further comprising:
 a second control device configured to be removably connected to a CAN bus of the first power machine to send control signals to the one or more processor devices for control of one or more actuators of the first power machine in the local control mode and control of one or more actuators of the second power machine in the remote control mode.

17. A method for executing one or more power-machine operations, the method comprising:
 receiving a first user input from a first user input device at one or more control devices on a first power machine that is spaced apart from a second power machine, the first user input corresponding to a first power-machine operation, wherein the first power machine is a power machine of a first machine type and the second power machine is a power machine of a second machine type different from the first machine type;
 receiving, at the one or more control devices, a selection of either of a local control mode or a remote control mode; and
 cooperatively controlling operation of one or more actuators, with the one or more control devices, to execute a work task, the cooperative control, including:
  if the received selection includes the local control mode, controlling operation of a first actuator of the first power machine based on the first user input to execute the work task; and
  if the received selection includes the remote control mode, controlling operation of a second actuator of the second power machine based on the first user input to execute the work task.

18. The method of claim 17, further comprising:
 receiving, at the one or more control devices, an authorization signal from a mobile device; and
 controlling the operation of the one or more actuators, in one or more of the local control mode or the remote control mode, further based on receiving the authorization signal.

19. The method of claim 17, further comprising:
 receiving a video signal from the second power machine during operation of the second actuator under the remote control mode; and
 displaying the video signal on a window of a cab of the first power machine.

20. A method for executing one or more power-machine operations, the method comprising:
 receiving, at one or more control devices, a first user input from a first user input device on a first power machine;

receiving, at the one or more control devices, a selection of a local control mode or a remote control mode; and cooperatively controlling operation of one or more actuators, with the one or more control devices, to execute a work task, the cooperative control, including:

if the received selection includes the local control mode, controlling operation of a first workgroup work element moved by a first actuator of the first power machine to execute the work task; and if the received selection includes the remote control mode, controlling operation of a second workgroup work element moved by a second actuator of a second power machine that is spaced apart from the first power machine to execute the work task, the second workgroup work element controlled via the first user input device on the first power machine.

21. The method of claim 20, wherein the first power machine is of a first machine type and the second power machine is of a second machine type different from the first machine type.

22. A method for executing one or more power-machine operations, the method comprising:

receiving, at one or more control devices on a first power machine, a selection of a remote control mode; and receiving, at the one or more control devices, a first user input provided at a first user input device on the first power machine; and with the one or more control devices, in response to receiving the selection of the remote control mode:

establishing a communication link with a second power machine that is spaced apart from the first power machine and is in a standby state in which the second power machine is not enabled to execute powered operation of work elements of the second power machine; and via the communication link:

waking the second power machine from the standby state to enable powered operation of the work elements of the second power machine; and cooperatively controlling operation of at least one of the work elements of the second power machine based on the first user input provided at the first user input device on the first power machine to perform a work task.

23. The method of claim 22, wherein the first user input corresponds to operation of at least one work element of the first power machine that is a different type of work element than the at least one work element of the second power machine.

* * * * *